US010165605B2

(12) United States Patent
Patwardhan et al.

(10) Patent No.: US 10,165,605 B2
(45) Date of Patent: Dec. 25, 2018

(54) DISCONTINUOUS RECEIVE FOR CONTENTION-BASED RADIO ACCESS TECHNOLOGIES

(71) Applicant: QUALCOMM Incorporated, San Diego, CA (US)

(72) Inventors: Ravindra Manohar Patwardhan, San Diego, CA (US); Madhavan Srinivasan Vajapeyam, San Diego, CA (US); Ajay Gupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 69 days.

(21) Appl. No.: 15/247,637

(22) Filed: Aug. 25, 2016

(65) Prior Publication Data

US 2017/0064770 A1    Mar. 2, 2017

Related U.S. Application Data

(60) Provisional application No. 62/210,622, filed on Aug. 27, 2015.

(51) Int. Cl.
*H04W 76/28* (2018.01)
*H04W 52/02* (2009.01)
(Continued)

(52) U.S. Cl.
CPC ......... *H04W 76/048* (2013.01); *H04W 24/02* (2013.01); *H04W 24/08* (2013.01);
(Continued)

(58) Field of Classification Search
None
See application file for complete search history.

(56) References Cited

U.S. PATENT DOCUMENTS

2009/0196200 A1*  8/2009  Moritomo ............. H04W 16/00
                                                                  370/254
2010/0208660 A1*  8/2010  Ji .......................  H04W 52/0225
                                                                  370/328
(Continued)

FOREIGN PATENT DOCUMENTS

EP       2 600 673 A1     6/2013
EP       3 016 457 A1     5/2016
(Continued)

OTHER PUBLICATIONS

International Search Report and Written Opinion—PCT/US2016/049090—ISA/EPO—Oct. 31, 2016 (153019WO). (18 total pages).

*Primary Examiner* — Faruk Hamza
*Assistant Examiner* — Cassandra L Decker
(74) *Attorney, Agent, or Firm* — Arent Fox, LLP

(57) ABSTRACT

Aspects described herein relate to receiving communications in contention-based radio access technologies (RAT). Communication resources can be activated for monitoring one or more channels related to a contention-based RAT based at least in part on a discontinuous receive (DRX) cycle. The one or more channels related to the contention-based RAT can be monitored in one or more time periods following activating the communication resources to determine whether communications are received from an access network node. An on-duration timer during which the communication resources remain active to receive the communications in the contention-based RAT can be initialized based at least in part on determining that the communications are received from the access network node. The communication resources can be deactivated following expiration of the on-duration timer.

26 Claims, 9 Drawing Sheets

(51) Int. Cl.
*H04W 24/08* (2009.01)
*H04W 24/02* (2009.01)
*H04W 74/08* (2009.01)
*H04W 16/14* (2009.01)
*H04W 76/04* (2009.01)

(52) U.S. Cl.
CPC ....... *H04W 52/0248* (2013.01); *H04W 74/08* (2013.01); *H04W 76/28* (2018.02); *H04W 16/14* (2013.01); *H04W 52/02* (2013.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/22* (2018.01); *Y02D 70/24* (2018.01); *Y02D 70/26* (2018.01)

(56) References Cited

U.S. PATENT DOCUMENTS

| | | | |
|---|---|---|---|
| 2011/0199910 A1* | 8/2011 | Oh | H04W 52/0229 370/241 |
| 2013/0235780 A1* | 9/2013 | Kim | H04W 52/0216 370/311 |
| 2014/0204850 A1* | 7/2014 | Kim | H04L 5/0078 370/329 |
| 2015/0003311 A1* | 1/2015 | Feuersaenger | H04W 52/0225 370/311 |
| 2015/0172950 A1 | 6/2015 | Chen et al. | |
| 2015/0257093 A1* | 9/2015 | Uchino | H04W 52/0216 370/311 |
| 2015/0319690 A1* | 11/2015 | Wei | H04L 5/0007 370/311 |
| 2015/0358786 A1* | 12/2015 | Kim | H04L 12/189 370/311 |
| 2016/0302226 A1* | 10/2016 | Kim | H04W 72/1289 |
| 2016/0345344 A1* | 11/2016 | Larsson | H04W 72/1289 |
| 2017/0048880 A1* | 2/2017 | Anderson | H04W 72/1226 |
| 2017/0135150 A1* | 5/2017 | Langereis | H04W 76/048 |
| 2017/0280500 A1* | 9/2017 | Kim | H04W 72/0446 |

FOREIGN PATENT DOCUMENTS

| | | |
|---|---|---|
| WO | WO-2014/025211 A1 | 2/2014 |
| WO | WO-2014/056154 A1 | 4/2014 |
| WO | WO-2014/209040 A1 | 12/2014 |
| WO | WO-2016/160292 A1 | 10/2016 |

* cited by examiner

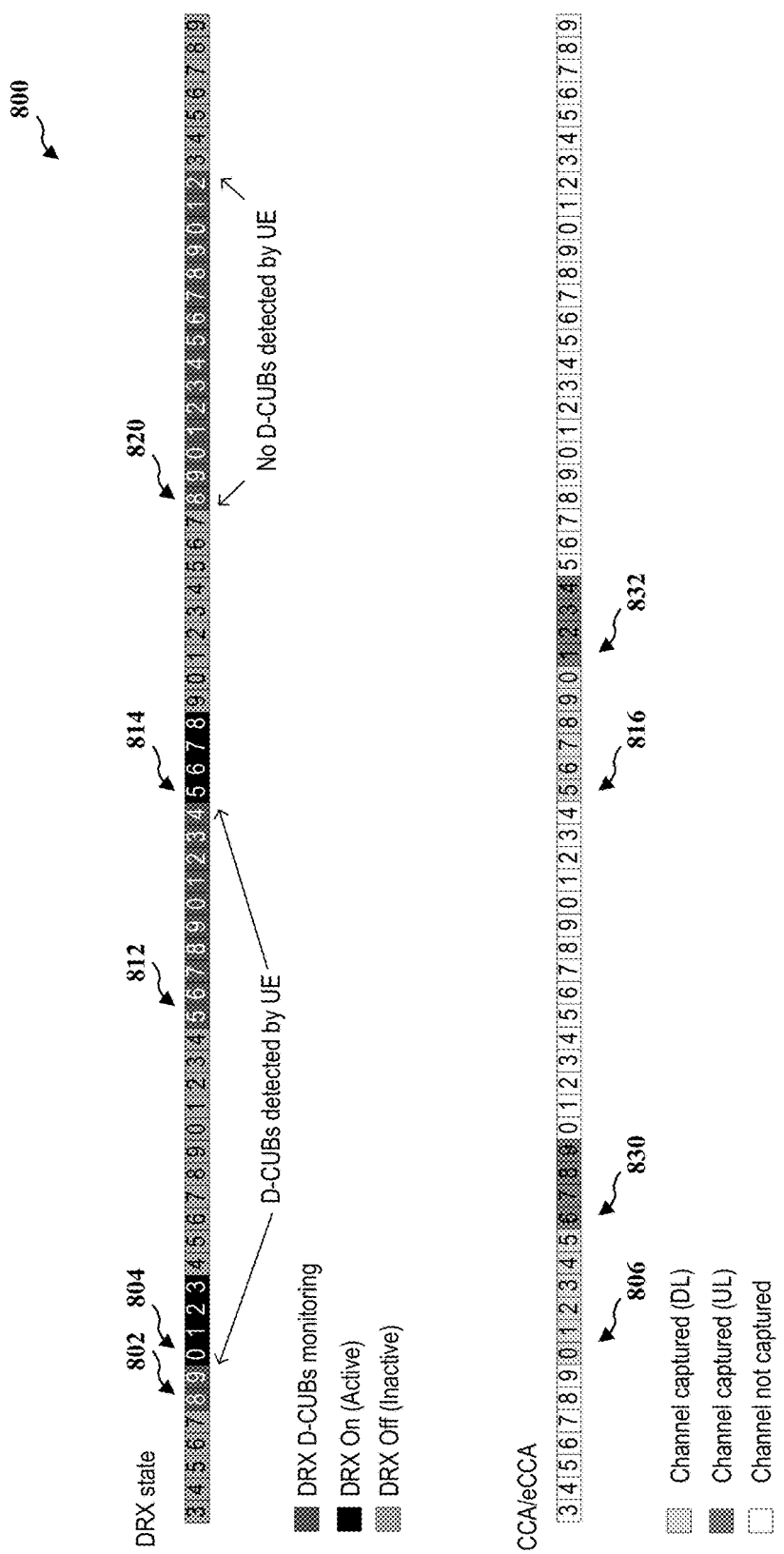

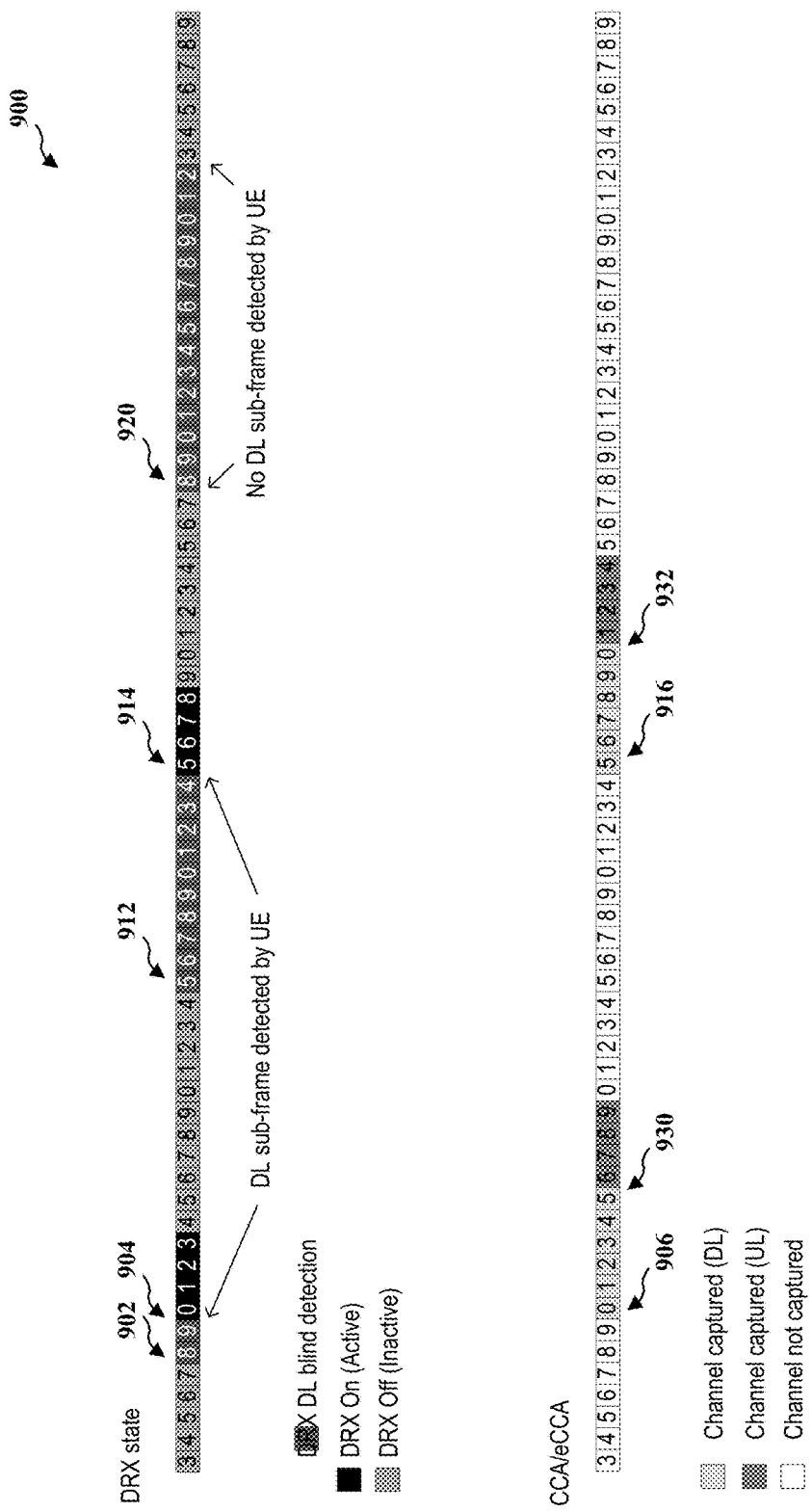

DISCONTINUOUS RECEIVE FOR CONTENTION-BASED RADIO ACCESS TECHNOLOGIES

CLAIM OF PRIORITY UNDER 35 U.S.C. § 119

The present application for patent claims priority to Provisional Application No. 62/210,622 entitled "DISCONTINUOUS RECEIVE FOR CONTENTION-BASED RADIO ACCESS TECHNOLOGIES" filed Aug. 27, 2015, which is assigned to the assignee hereof and hereby expressly incorporated by reference herein for all purposes.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple user equipment devices (UE). Each UE communicates with one or more base stations, such as an evolved Node B (eNB) via transmissions on the forward and reverse links. The forward link (or downlink) refers to the communication link from the eNBs to the UEs, and the reverse link (or uplink) refers to the communication link from the UEs to the eNBs. This communication link may be established via a single-in-single-out, multiple-in-single-out or a multiple-in-multiple-out (MIMO) system. In this regard, the UEs can access wireless network via one or more eNBs.

Additionally, LTE radio access functionality has been extended into unlicensed frequency spectrums, such as the Unlicensed National Information Infrastructure (U-NII) band used by Wireless Local Area Network (WLAN) technologies. This extension of cell LTE operation is designed to increase spectral efficiency and hence capacity of the LTE system, and is often provided by small cells. Examples of radio access technologies (RATs) that provide LTE functionality over WLAN technologies include LTE in an unlicensed spectrum (LTE-U). To use resources for communicating in the unlicensed band, LTE-U network nodes perform a clear channel assessment (CCA)/enhanced CCA (eCCA) to determine whether a corresponding channel is available before transmitting communications. In this regard, it may not be possible to determine the exact timeline for transmitting/receiving communications in the network.

In addition, LTE user equipment (UE) or other devices may be configured to operate in a discontinuous receive (DRX) mode where an evolved Node B (eNB) can configure the UE or other devices with parameters defining periods of time during which the UE can activate communication resources (e.g., on-durations) and deactivate (or sleep) communication resources (e.g., off-durations) to decrease power consumption by the UE. When a UE is in discontinuous receive (DRX) mode and is operating using a contention-based RAT, however, the configured on-durations may occur over time periods where the eNB has not been able to successfully acquire a channel for communicating in the unlicensed band. In this example, the DRX on-duration may be wasted, which lessens the effectiveness of DRX for decreasing power consumption at the UE. In addition, in an example, the eNB may acquire the channel and begin transmitting towards the end of the on-duration, and thus the UE may enter an off duration before receiving all communications from the eNB (e.g., and may sleep communication resources based on the DRX mode parameters).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for receiving communications in contention-based radio access technologies (RAT) is provided. The method includes activating communication resources for monitoring one or more channels related to a contention-based RAT based at least in part on a discontinuous receive (DRX) cycle, monitoring the one or more channels related to the contention-based RAT in one or more time periods following activating the communication resources to determine whether communications are received from an access network node, initializing an on-duration timer during which the communication resources remain active to receive the communications in the contention-based RAT based at least in part on determining that the communications are received from the access network node, and deactivating the communication resources following expiration of the on-duration timer.

In another example, an apparatus for receiving communications in contention-based RATs is provided. The apparatus includes a transceiver, one or more antenna coupled to the transceiver for communicating signals in a wireless network, at least one processor communicatively coupled with the transceiver via a bus, and a memory communicatively coupled with the at least one processor and/or the transceiver via the bus. The at least one processor is configured to activate communication resources for monitoring one or more channels related to a contention-based RAT based at least in part on a DRX cycle, monitor, via the transceiver, the one or more channels related to the contention-based RAT in one or more time periods following activating the communication resources to determine whether communications are received from an access network node, initialize an on-duration timer during which the communication resources remain active to receive the communications in the contention-based RAT based at least in part on determining that the communications are received from the access network node, and deactivate the communication resources following expiration of the on-duration timer.

In another example, an apparatus for receiving communications in contention-based RATs is provided. The apparatus includes means for activating communication resources for monitoring one or more channels related to a contention-based RAT based at least in part on a DRX cycle, means for monitoring the one or more channels related to the contention-based RAT in one or more time periods following activating the communication resources to determine whether communications are received from an access network node, means for initializing an on-duration timer during which the communication resources remain active to receive the communications in the contention-based RAT based at least in part on determining that the communications are received from the access network node, and means for deactivating the communication resources following expiration of the on-duration timer.

In another example, a computer-readable storage medium comprising computer-executable code for receiving communications in contention-based RATs is provided. The code includes code for activating communication resources for monitoring one or more channels related to a contention-based RAT based at least in part on a DRX cycle, code for monitoring the one or more channels related to the contention-based RAT in one or more time periods following activating the communication resources to determine whether communications are received from an access network node, code for initializing an on-duration timer during which the communication resources remain active to receive the communications in the contention-based RAT based at least in part on determining that the communications are received from the access network node, and code for deactivating the communication resources following expiration of the on-duration timer.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

FIG. 8 illustrates an example of a communication timeline in accordance with aspects described herein.

FIG. 9 illustrates another example of a communication timeline in accordance with aspects described herein.

DETAILED DESCRIPTION

Figure 1:
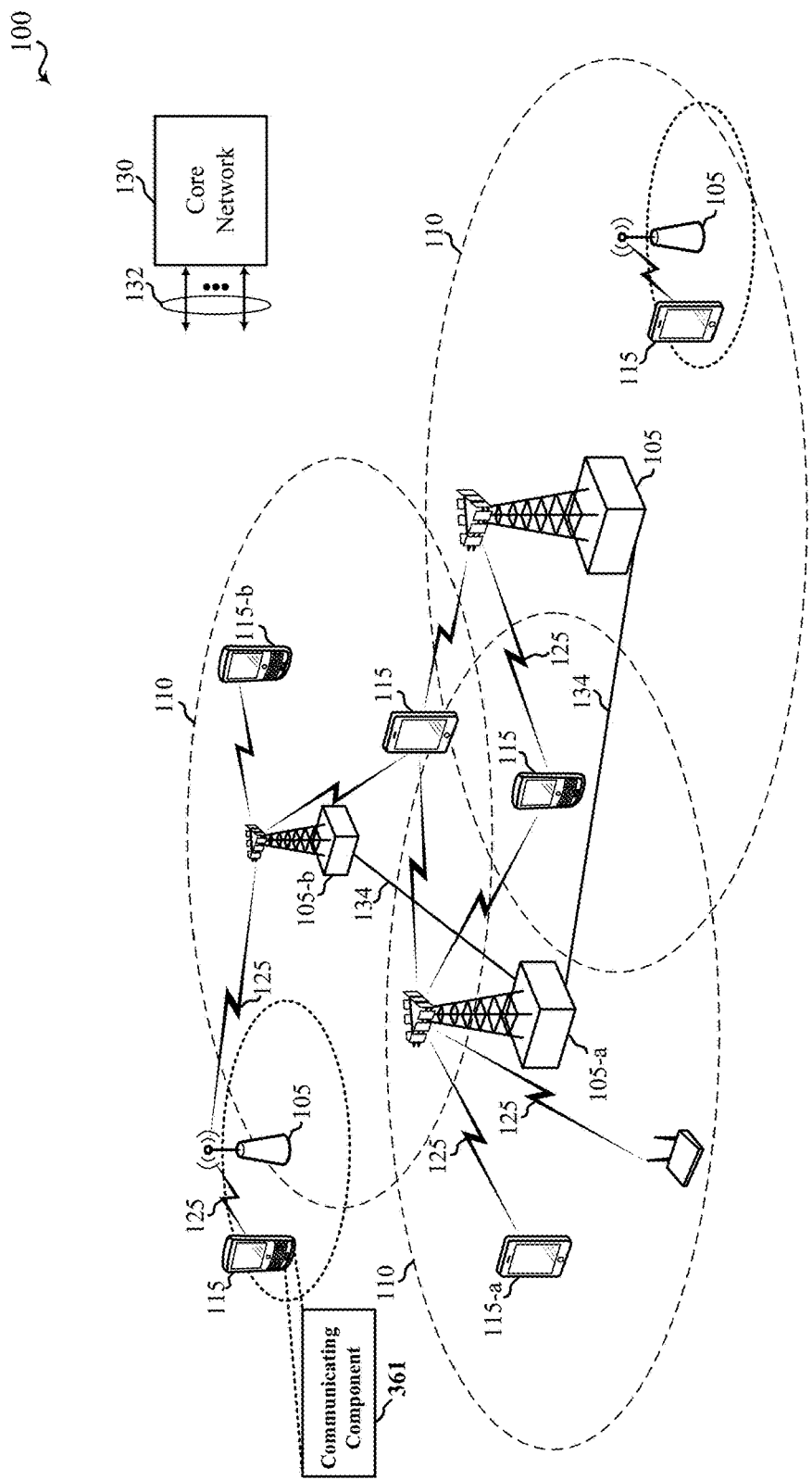
FIG. 1 shows a block diagram conceptually illustrating an example of a telecommunications system, in accordance with aspects described herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Described herein are various aspects related to improving discontinuous reception (DRX) performance in contention-based radio access technologies (RAT). For example, contention-based RATs may include RATs that operate in an unlicensed frequency spectrum for which nodes perform a clear channel assessment (CCA)/enhanced CCA (eCCA) to determine whether a channel is available before transmitting communications thereover. For example, contention-based RATs may include third generation partnership project (3GPP) long term evolution (LTE) in an unlicensed band (LTE-U), enhanced component carrier (eCC), Institute of Electrical and Electronics Engineers (IEEE) 802.11 technologies (e.g., IEEE 802.11a, IEEE 802.11g, IEEE 802.11n, IEEE 802.11ac, etc.), and/or the like. DRX, which is also referred to herein as discontinuous receive, may be defined by one or more parameters configured for a device (e.g., by a node transmitting to the device), including one or more DRX cycle parameters defining periods of activity (on-durations) and inactivity (off-durations) for the communication resources, an on-duration parameter defining a duration of time during the one or more DRX cycles during which communications resources are to be activated to receive communications from the transmitting node, etc. It is possible that the on-durations may not match a successful CCA/eCCA by the transmitting node, and thus the on-durations may be wasted at the device operating in DRX mode. In this regard, for example, the device can operate in DRX mode in contention-based RATs, such to mitigate wasted on-durations, in accordance with aspects described herein. For example, the device can perform downlink subframe detection to detect one or more subframes over one or more channels from the transmitting node, and accordingly determining whether and/or when to initialize one or more timers defining the DRX mode (e.g., the on-duration timer, a minimum on-duration timer, etc.).

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, user equipment, or user equipment device. A wireless terminal can be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station can be utilized for communicating with wireless terminal(s) and can also be referred to as an access point, access node, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (WiFi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN (WLAN), BLUETOOTH and any other short- or long-range, wireless communication techniques.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

Referring first to FIG. 1, a diagram illustrates an example of a wireless communications system 100, in accordance with aspects described herein. The wireless communications system 100 includes a plurality of access points (e.g., base stations, eNBs, or WLAN access points) 105, a number of user equipment (UEs) 115, and a core network 130. UEs 115 can include a communicating component 361 for operating in DRX mode based on one or more configured parameters such to receive communications in contention-based RATs.

Some of the access points 105 may communicate with the UEs 115 under the control of a base station controller (not shown), which may be part of the core network 130 or the certain access points 105 (e.g., base stations or eNBs) in various examples. Access points 105 may communicate control information and/or user data with the core network 130 through backhaul links 132. In examples, the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each of communication links 125 may be a multi-carrier signal modulated according to the various radio technologies described above. Each modulated signal may be sent on a different carrier and may carry control information (e.g., downlink reference signals, downlink control channels, etc.), overhead information, data, etc.

In this regard, a UE 115 can be configured to communicate with one or more access points 105 over multiple carriers using carrier aggregation (CA) (e.g., with one access point 105) and/or multiple connectivity (e.g., with multiple access points 105). In either case, UE 115 can be configured with at least one primary cell (PCell) configured to support uplink and downlink communications between UE 115 and an access point 105. It is to be appreciated that there can be a PCell for each of communication links 125 between a UE 115 and a given access point 105. In addition, each of the communication links 125 can have one or more secondary cells (SCell) that can support uplink and/or downlink communications as well. In some examples, the PCell can be used to communicate at least a control channel, and the SCell can be used to communicate a data channel.

The access points 105 may wirelessly communicate with the UEs 115 via one or more access point antennas. Each of the access points 105 sites may provide communication coverage for a respective coverage area 110. In some examples, access points 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies (RAT). The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In LTE/LTE-Advanced (LTE-A) network communication systems, the terms evolved Node B (eNodeB or eNB) may be generally used to describe the access points 105. The wireless communications system 100 may be a Heterogeneous LTE/LTE-A network in which different types of access points provide coverage for various geographical regions. For example, each access point 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs 115 with service subscriptions with the network provider. A small cell would generally cover a relatively smaller geographic area and may allow unrestricted access by UEs 115 with service subscriptions with the network provider, for example, and in addition to unrestricted access, may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells. The term eNB, as used generally herein, may relate to a macro eNB and/or a small cell eNB. In an example, a small cell may operate in an "unlicensed" frequency band or spectrum, which can refer to a portion of radio frequency (RF) space that is not licensed for use by one or more wireless wide area network (WWAN) technologies, but may or may not be used by other communication technologies (e.g., wireless local area network (WLAN) technologies, such as Wi-Fi). Moreover, a network or device that provides, adapts, or extends its operations for use in an "unlicensed" frequency band or spectrum may refer to a network or device that is configured to operate in a contention-based radio frequency band or spectrum. In addition, for illustration purposes, the description below may refer in some respects to an LTE system operating on an unlicensed band by way of example when appropriate, although it is to be appreciated that such descriptions are not intended to exclude other cellular communication technologies. LTE-U may also be referred to herein as LTE/LTE-A in unlicensed spectrum, or simply LTE, in the surrounding context.

The core network 130 may communicate with the eNBs or other access points 105 via a backhaul links 132 (e.g., S1 interface, etc.). The access points 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the access points 105 may have similar frame timing, and transmissions from different access points 105 may be approximately aligned in time. For asynchronous operation, the access points 105 may have different frame timing, and transmissions from different access points 105 may not be aligned in time. Furthermore, transmissions in the first hierarchical layer and second hierarchical layer may or may not be synchronized among access points 105. The techniques described herein may be used for either synchronous or asynchronous operations.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNodeBs, small cell eNodeBs, relays, and the like. A UE 115 may also be able to communicate over different access networks, such as cellular or other WWAN access networks, or WLAN access networks.

The communication links 125 shown in wireless communications system 100 may include uplink (UL) transmissions from a UE 115 to an access point 105, and/or downlink (DL) transmissions, from an access point 105 to a UE 115. The downlink transmissions may also be called forward link transmissions while the uplink transmissions may also be called reverse link transmissions. The communication links 125 may carry transmissions of each hierarchical layer which, in some examples, may be multiplexed in the communication links 125. The UEs 115 may be configured to collaboratively communicate with multiple access points 105 through, for example, Multiple Input Multiple Output (MIMO), carrier aggregation (CA), Coordinated Multi-Point (CoMP), multiple connectivity (e.g., CA with each of one or more access points 105) or other schemes. MIMO techniques use multiple antennas on the access points 105 and/or multiple antennas on the UEs 115 to transmit multiple data streams. Carrier aggregation may utilize two or more component carriers on a same or different serving cell for data transmission. CoMP may include techniques for coordination of transmission and reception by a number of access points 105 to improve overall transmission quality for UEs 115 as well as increasing network and spectrum utilization.

As mentioned, in some examples access points 105 and UEs 115 may utilize carrier aggregation to transmit on multiple carriers. In some examples, access points 105 and UEs 115 may concurrently transmit in a first hierarchical layer, within a frame, one or more subframes each having a first subframe type using two or more separate carriers. Each carrier may have a bandwidth of, for example, 20 MHz, although other bandwidths may be utilized. For example, if four separate 20 MHz carriers are used in a carrier aggregation scheme in the first hierarchical layer, a single 80 MHz carrier may be used in the second hierarchical layer. The 80 MHz carrier may occupy a portion of the radio frequency spectrum that at least partially overlaps the radio frequency spectrum used by one or more of the four 20 MHz carriers. In some examples, scalable bandwidth for the second hierarchical layer type may be combined techniques to provide shorter RTTs such as described above, to provide further enhanced data rates.

Each of the different operating modes that may be employed by wireless communications system 100 may operate according to frequency division duplexing (FDD) or time division duplexing (TDD). In some examples, different hierarchical layers may operate according to different TDD or FDD modes. For example, a first hierarchical layer may operate according to FDD while a second hierarchical layer may operate according to TDD. In some examples, OFDMA communications signals may be used in the communication links 125 for LTE downlink transmissions for each hierarchical layer, while single carrier frequency division multiple access (SC-FDMA) communications signals may be used in the communication links 125 for LTE uplink transmissions in each hierarchical layer. Additional details regarding implementation of hierarchical layers in a system such as the wireless communications system 100, as well as other features and functions related to communications in such systems, are provided below with reference to the following figures.

Figure 2:
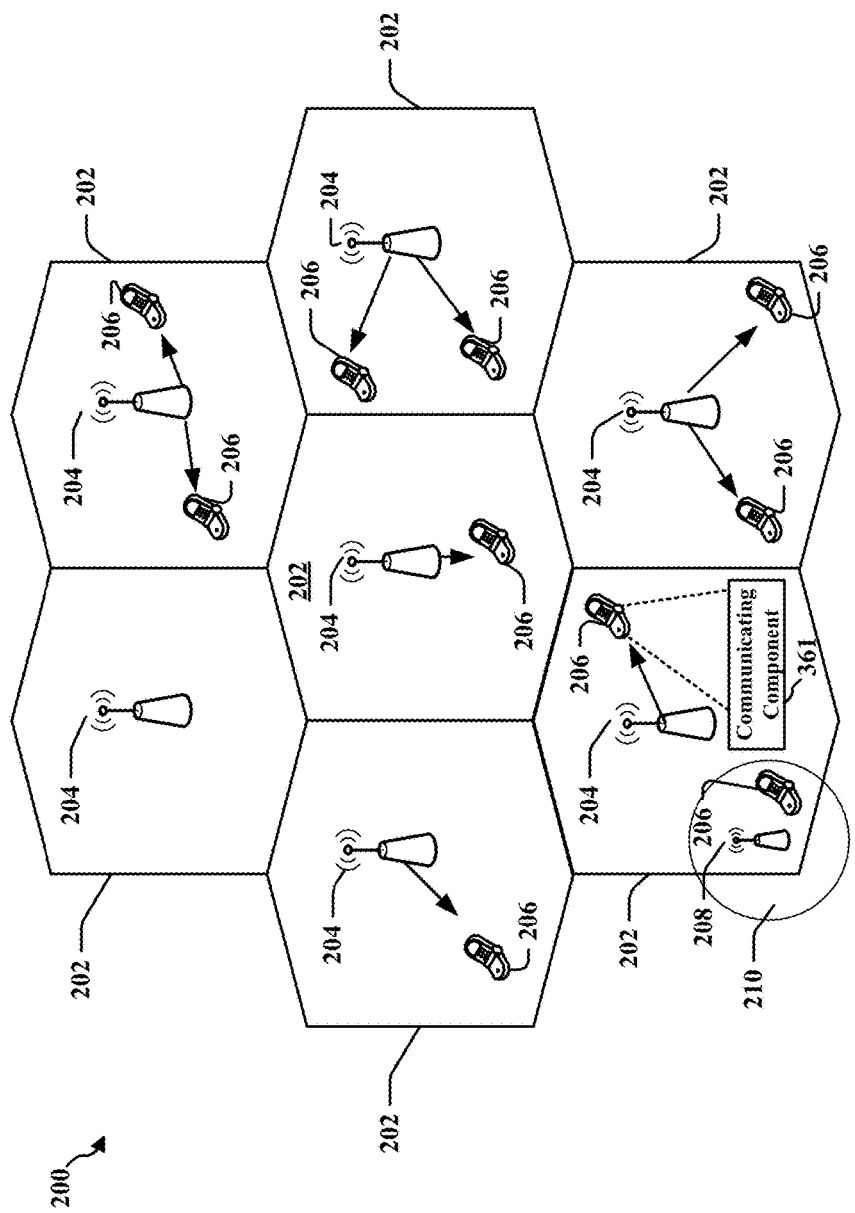
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNBs 208 may be a small cell (e.g., home eNB (HeNB)), femto cell pico cell, micro cell, or remote radio head (RRH). The macro eNBs 204 are each assigned to a respective cell 202 and are configured to provide an access point to the core network 130 for all the UEs 206 in the cells 202. In an aspect, UEs 206 can include a communicating component 361 for operating in DRX mode based on one or more configured parameters such to receive communications in contention-based RATs. There is no centralized controller shown in this example of an access network 200, but a centralized controller may be used in alternative configurations. The eNBs 204 are responsible for all radio related functions including radio bearer control, admission control, mobility control, scheduling, security, and connectivity to a serving gateway.

The modulation and multiple access scheme employed by the access network 200 may vary depending on the particular telecommunications standard being deployed. In LTE applications, OFDM may be used on the DL and SC-FDMA may be used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
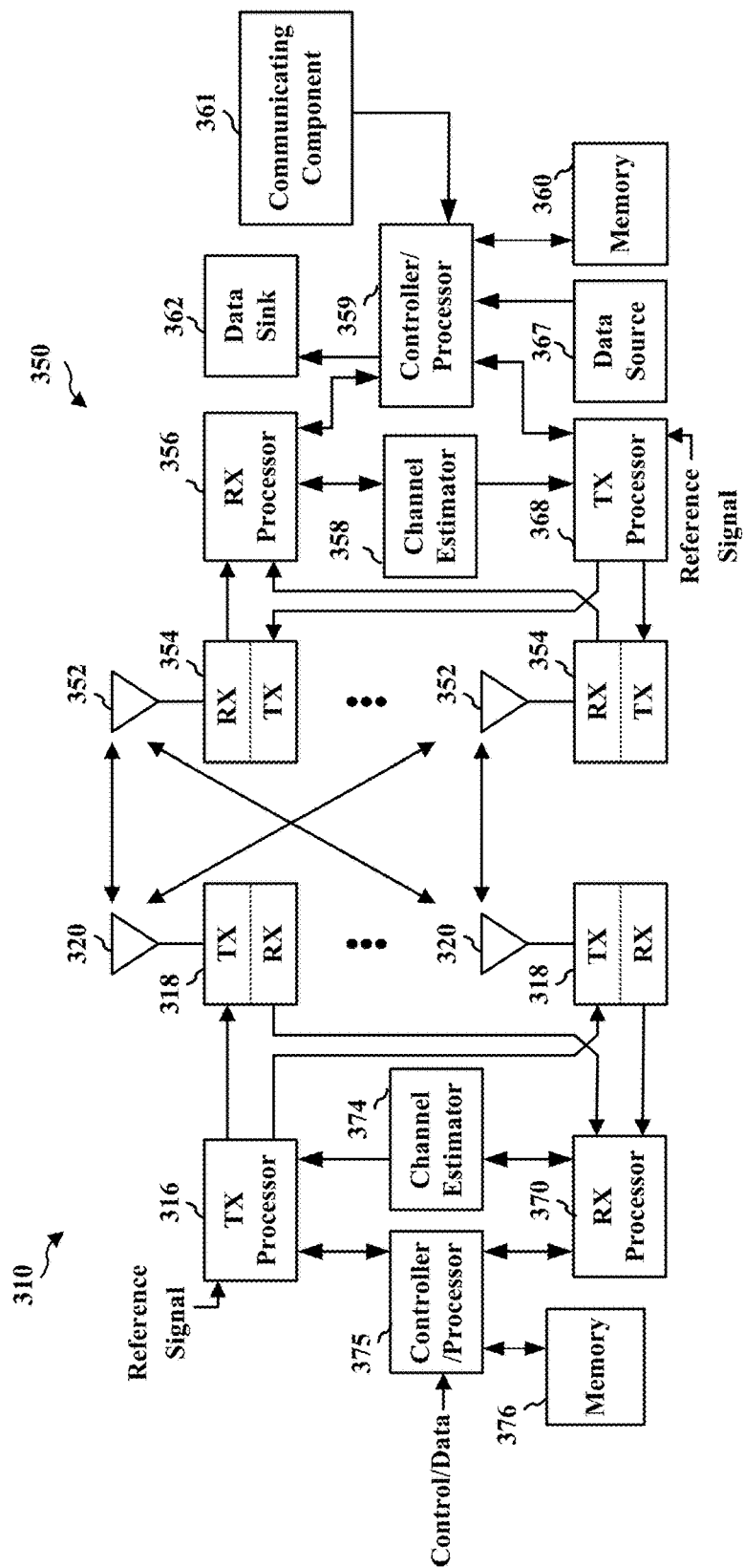
FIG. 3 is a diagram illustrating an example of an evolved Node B and user equipment in an access network.

FIG. 3 is a block diagram of an eNB 310 in communication with a UE 350 in an access network. In the DL, upper layer packets from the core network are provided to a controller/processor 375. The controller/processor 375 implements the functionality of the L2 layer. In the DL, the controller/processor 375 provides header compression, ciphering, packet segmentation and reordering, multiplexing between logical and transport channels, and radio resource allocations to the UE 350 based on various priority metrics. The controller/processor 375 is also responsible for hybrid automatic repeat/request (HARQ) operations, retransmission of lost packets, and signaling to the UE 350.

The transmit (TX) processor 316 implements various signal processing functions for the L1 layer (i.e., physical layer). The signal processing functions includes coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream is then provided to a different antenna 320 via a separate transmitter 318TX. Each transmitter 318TX modulates an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The RX processor 356 implements various signal processing functions of the L1 layer. The RX processor 356 performs spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359.

The controller/processor 359 implements the L2 layer. The controller/processor can be associated with a memory 360 that stores program codes and data. The memory 360 may be referred to as a computer-readable medium. In the UL, the controller/processor 359 provides demultiplexing between transport and logical channels, packet reassembly, deciphering, header decompression, control signal processing to recover upper layer packets from the core network. The upper layer packets are then provided to a data sink 362, which represents all the protocol layers above the L2 layer. Various control signals may also be provided to the data sink 362 for L3 processing. The controller/processor 359 is also responsible for error detection using an acknowledgement (ACK) and/or negative acknowledgement (NACK) protocol to support HARQ operations. In addition, UE 350 may include a communicating component 361 for operating in DRX mode based on one or more configured parameters such to receive communications in contention-based RATs. Though communicating component 361 is shown as coupled to controller/processor 359, it is to be appreciated that communicating component 361 can also be coupled to other processors (e.g., RX processor 356, TX processor 368, etc.) and/or implemented by the one or more processors 356, 359, 368 to perform actions described herein.

In the UL, a data source 367 is used to provide upper layer packets to the controller/processor 359. The data source 367 represents all protocol layers above the L2 layer. Similar to the functionality described in connection with the DL transmission by the eNB 310, the controller/processor 359 implements the L2 layer for the user plane and the control plane by providing header compression, ciphering, packet segmentation and reordering, and multiplexing between logical and transport channels based on radio resource allocations by the eNB 310. The controller/processor 359 is also responsible for HARQ operations, retransmission of lost packets, and signaling to the eNB 310.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 are provided to different antenna 352 via separate transmitters 354TX. Each transmitter 354TX modulates an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The RX processor 370 may implement the L1 layer.

The controller/processor 375 implements the L2 layer. The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

Figure 4:
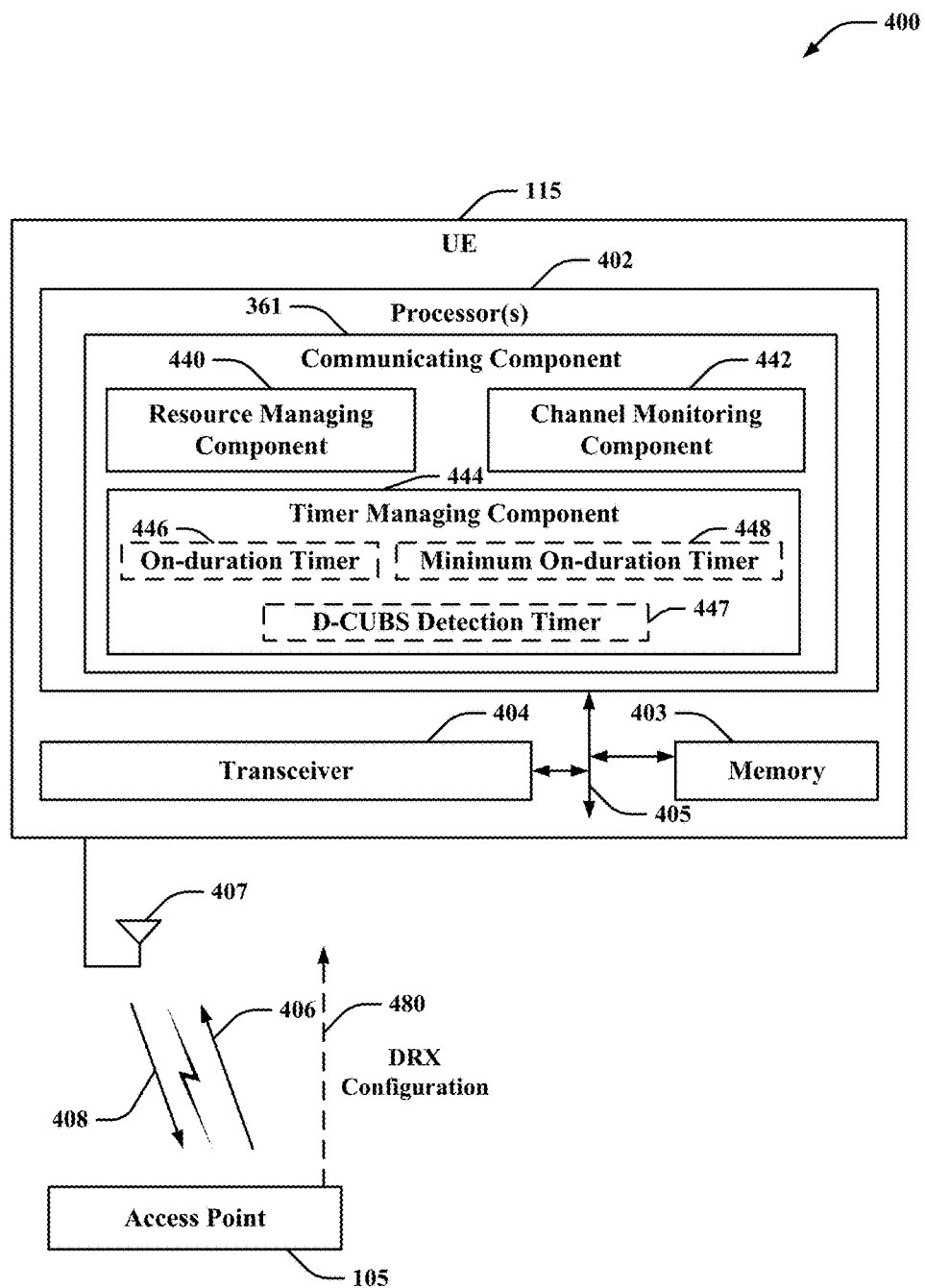
FIG. 4 illustrates an example of a system for operating in a discontinuous receive (DRX) mode in a contention-based radio access technology (RAT) in accordance with aspects described herein.
Figure 5:
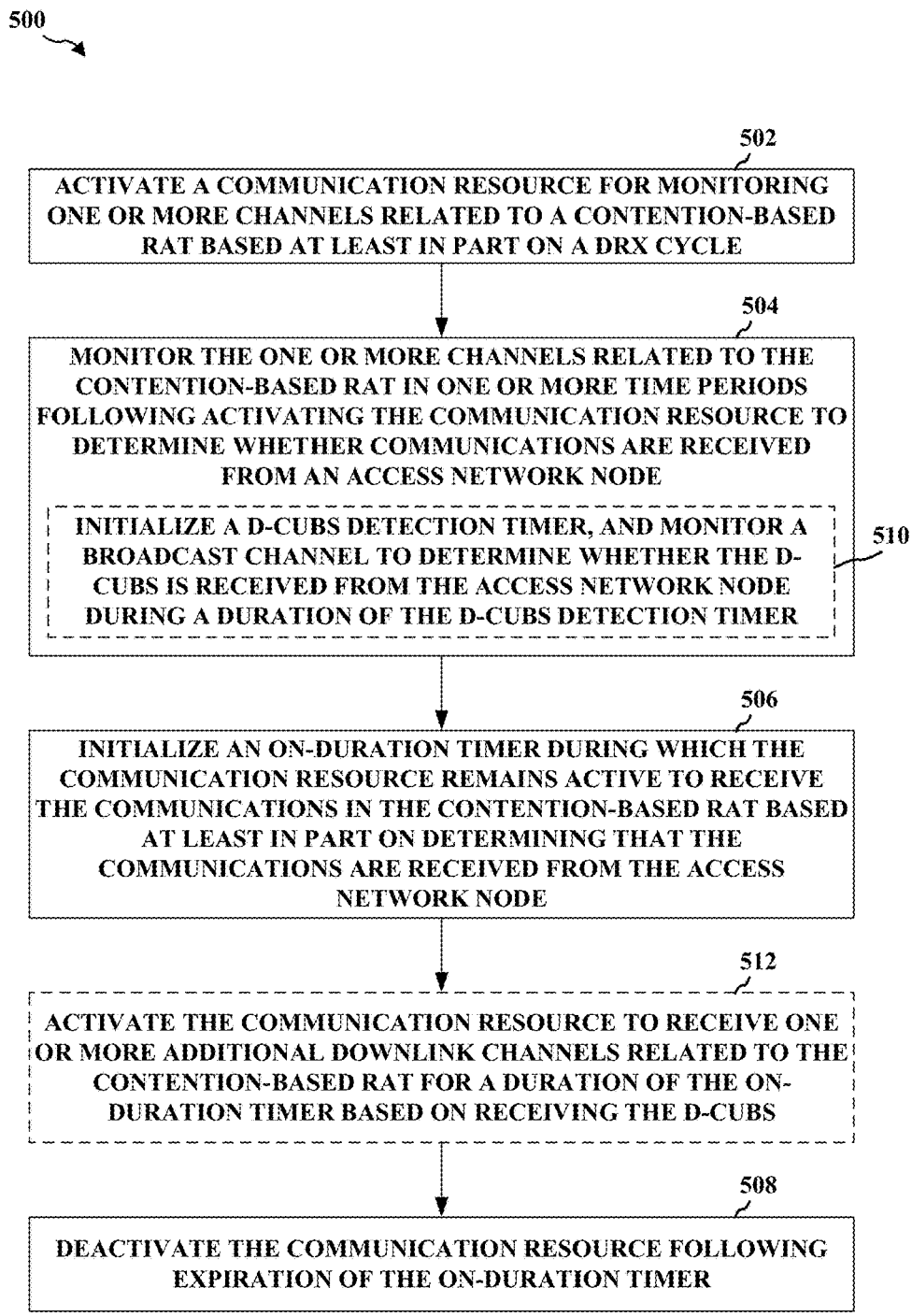
FIG. 5 illustrates an example of a method for operating in a DRX mode in a contention-based RAT in accordance with aspects described herein.
Figure 6:
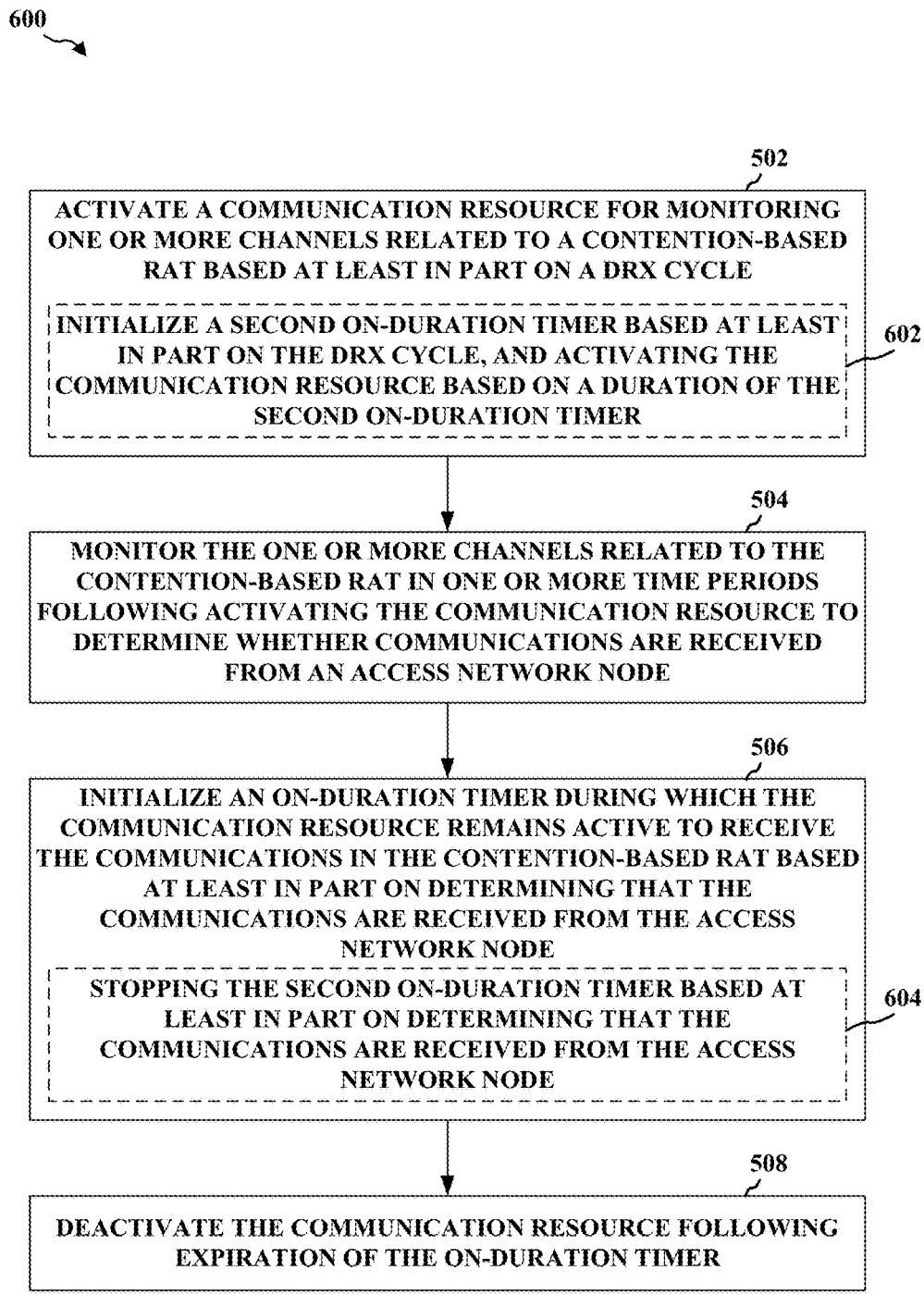
FIG. 6 illustrates another example of a method for operating in a DRX mode in a contention-based RAT in accordance with aspects described herein.
Figure 7:
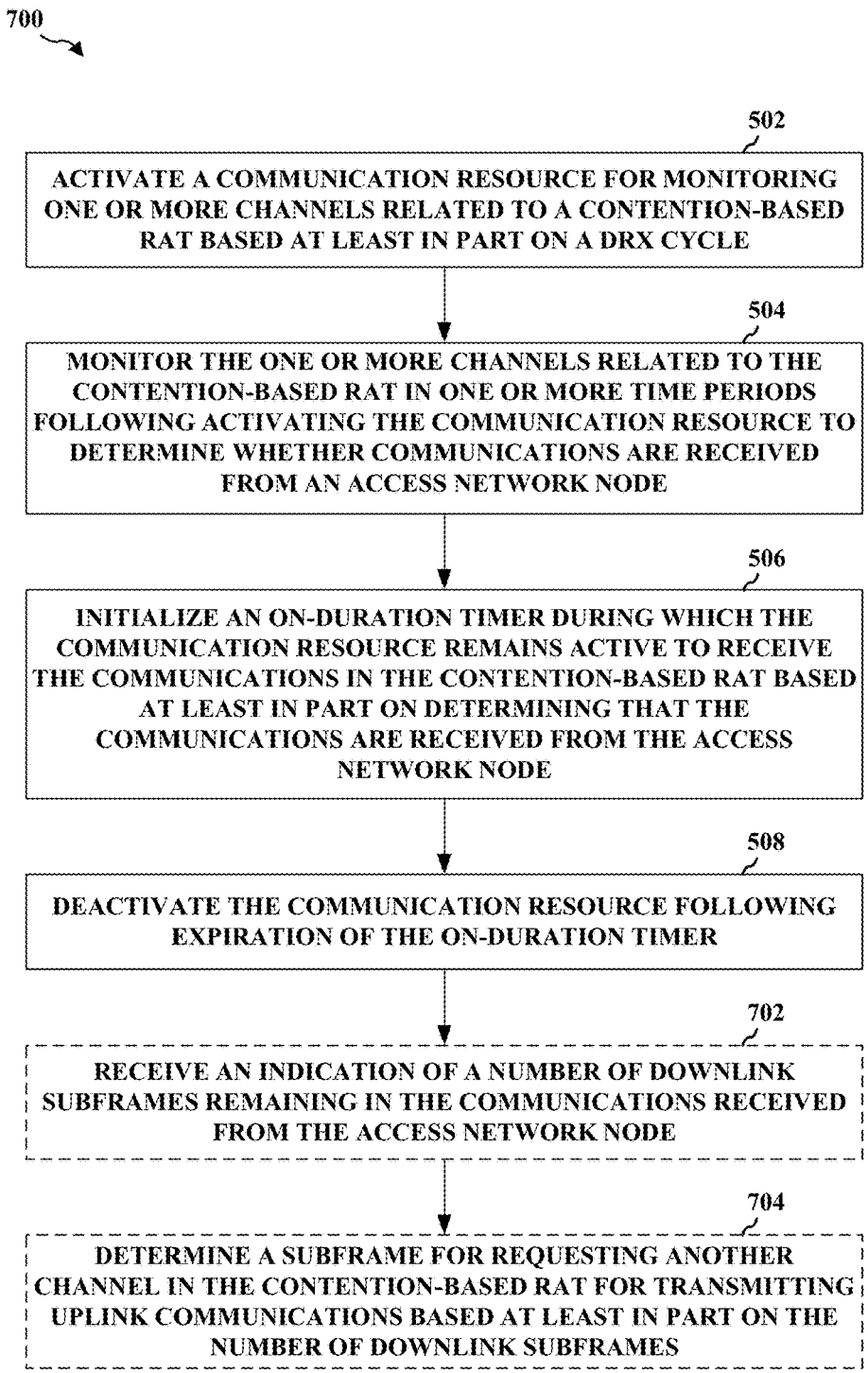
FIG. 7 illustrates yet another example of a method for operating in a DRX mode in a contention-based RAT in accordance with aspects described herein

Turning now to FIGS. 4-9, aspects are depicted with reference to one or more components and one or more methods that may perform the actions or operations described herein, where aspects in dashed line may be optional. Although the operations described below in FIGS. 5-7 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

FIG. 4 depicts a system 400 for operating in a DRX mode in a contention-based RAT. System 400 includes a UE 115 that communicates with an access point 105 to access a wireless network, examples of which are described in FIGS. 1-3 above. In an aspect, access point 105 and UE 115 may have established one or more downlink channels over which downlink signals 406 can be transmitted by access point 105 and received by UE 115 (e.g., via one or more antennas 407, one or more transceivers 404, one or more RF front end components, etc.) for communicating control and/or data messages (e.g., signaling) from the access point 105 to the UE 115 over configured communication resources. Moreover, for example, access point 105 and UE 115 may have established one or more uplink channels over which uplink signals 408 can be transmitted by UE 115 (e.g., via one or more antennas, 407, one or more transceivers 404, one or more RF front end components, etc.) and received by access point 105 for communicating control and/or data messages (e.g., signaling) from the UE 115 to the access point 105 over configured communication resources.

For example, access point 105 may transmit one or more parameters related to a DRX configuration 480 (which is generally referred to herein as a DRX configuration, but may include the one or more parameters in one or more messages transmitted by access point 105 and/or other devices) to UE 115, which is received via one or more antennas 407, one or more transceivers 404, and/or one or more RF front end components, etc. Accordingly, UE 115 may operate in a DRX mode based on the DRX configuration 480 to activate and/or deactivate communication resources (e.g., one or more antennas 407, one or more transceivers 404, one or more related processors such as a modem processor, one or more RF front end components, such as power amplifier(s), low-noise amplifier(s), filter(s), etc., and/or the like) according to one or more parameters in the DRX configuration 480. In LTE, for example, DRX configuration 480 may include at least one of: (1) a short DRX cycle parameter (shortDRX-Cycle) that indicates a length of a short DRX cycle, which includes a period of activated communication resources and/or a period of deactivated communication resources; (2) a short cycle timer parameter (drxShortCycleTimer) that indicates a number of short DRX cycles to perform before entering a long DRX cycle; (3) long DRX cycle offset and start parameters (longDRX-CycleStartOffset) that indicate a cycle and offset for a long DRX cycle, which can be in multiples of short DRX cycle; (4) an on-duration timer (onDurationTimer) parameter that indicates a duration for maintaining active communication resources at the start of a DRX cycle to receive communications from the access point 105; (5) an inactivity timer (drx-Inactivity Timer) that indicates a duration after which if no activity is detected over a channel, the UE 115 can enter a DRX cycle (e.g., one or more DRX short cycles to start); and/or (6) a retransmission timer (drx-RetransmissionTimer) that indicates a duration of time for monitoring the channel when a retransmission is expected from the access point 105. In an example, the durations may be specified in units of physical downlink control channel (PDCCH) subframes.

In this regard, in LTE for example, when UE 115 detects no data activity for a duration defined by drx-Inactivity-Timer or receives a DRX command from the access point 105, the UE 115 can determine to start a short DRX cycle (if configured) based on the short DRX cycle parameter and can initialize the short cycle timer based on the short cycle timer parameter. After expiration of the short cycle timer, or initially if the UE 115 is not configured with short DRX cycle parameters, the UE 115 can determine to start a long DRX cycle based on the long DRX cycle offset and start parameters. During DRX cycles, the UE 115 can activate the communication resources for the duration defined by the onDurationTimer (e.g., and/or based on detecting data activity and the drx-InactivityTimer, a received DRX command, a HARQ round trip time (RTT) timer, the drx-RetransmissionTimer, etc.). As described, in contention-based RATs, it may not be possible to know whether a channel will be available for access point 105 to communicate with the UE 115 during an on-duration of the UE 115. Accordingly, as described further herein, UE 115 can operate in the DRX mode based on detecting certain downlink subframes and/or initializing additional timers (which may be based on additional parameters received in the DRX configuration 480) to facilitate improved usage of the DRX mode in contention-based RATs. In addition, though shown and described as a UE 115 performing the functions described herein, it is to be appreciated that substantially any network node using substantially any RAT to communicate with another network node can utilize the described functions to enhance DRX mode communications.

In an aspect, UE 115 may include one or more processors 402 and/or a memory 403 that may be communicatively coupled, e.g., via one or more buses 405, and may operate in conjunction with or otherwise implement a communicating component 361 for operating in DRX mode based on one or more configured parameters such to receive communications in contention-based RATs. For example, the various operations related to the communicating component 361 may be implemented or otherwise executed by one or more processors 402 and, in an aspect, can be executed by a single processor, while in other aspects, different ones of the operations may be executed by a combination of two or more different processors. For example, in an aspect, the one or more processors 402 may include any one or any combination of a modem processor, or a baseband processor, or a digital signal processor, or an application specific integrated circuit (ASIC), or a transmit processor, or a transceiver processor associated with transceiver 404. Further, for example, the memory 403 may be a non-transitory computer-readable medium that includes, but is not limited to, random access memory (RAM), read only memory (ROM), programmable ROM (PROM), erasable PROM (EPROM), electrically erasable PROM (EEPROM), a magnetic storage device (e.g., hard disk, floppy disk, magnetic strip), an optical disk (e.g., compact disk (CD), digital versatile disk (DVD)), a smart card, a flash memory device (e.g., card, stick, key drive), a register, a removable disk, and any other suitable medium for storing software and/or computer-readable code or instructions that may be accessed and read by a computer or one or more processors 402. Moreover, memory 403 or computer-readable storage medium may be resident in the one or more processors 402, external to the one or more processors 402, distributed across multiple entities including the one or more processors 402, etc.

In particular, the one or more processors 402 and/or memory 403 may execute actions or operations defined by communicating component 361 or its subcomponents. For instance, the one or more processors 402 and/or memory 403 may execute actions or operations defined by resource managing component 440 for activating and/or deactivating communication resources of the UE 115 (e.g., one or more antennas 407, one or more transceivers 404, one or more related processors such as a modem processor, one or more RF front end components, etc.) based on one or more parameters of a DRX configuration (e.g., DRX configuration 480). In an aspect, for example, resource managing component 440 may include hardware (e.g., one or more processor modules of the one or more processors 402) and/or computer-readable code or instructions stored in memory 403 and executable by at least one of the one or more processors 402 to perform the specially configured communication resource managing operations described herein. Further, for instance, the one or more processors 402 and/or memory 403 may execute actions or operations defined by channel monitoring component 442 for determining whether communications are received from an access network node (e.g., access point 105) where the communication resources have been activated. In an aspect, for example, channel monitoring component 442 may include hardware (e.g., one or more processor modules of the one or more processors 402) and/or computer-readable code or instructions stored in memory 403 and executable by at least one of the one or more processors 402 to perform the specially configured channel monitoring operations described herein. Further, for instance, the one or more processors 402 and/or memory 403 may also execute actions or operations defined by timer managing component 444 for managing one or more timers related to a DRX configuration to facilitate resource managing component 440 activating/deactivating communication resources based on the DRX configuration. In an aspect, for example, timer managing component 444 may include hardware (e.g., one or more processor modules of the one or more processors 402) and/or computer-readable code or instructions stored in memory 403 and executable by at least one of the one or more processors 402 to perform the specially configured timer managing operations described herein.

In an example, transceiver 404 may be configured to transmit and receive wireless signals through one or more antennas, such as antenna 407, one or more RF front end components (e.g., power amplifiers, low-noise amplifiers, filters, etc.), one or more transmitters, one or more receivers, etc. In an aspect, transceiver 404 may be tuned to operate at specified frequencies such that UE 115 can communicate at a certain frequency. In an aspect, the one or more processors 402 may configure transceiver 404 to operate at a specified frequency and power level based on a configuration, a communication protocol, etc.

In an aspect, transceiver 404 can operate in multiple bands (e.g., using a multiband-multimode modem, not shown) such to process digital data sent and received using transceiver 404. In an aspect, transceiver 404 can be multiband and be configured to support multiple frequency bands for a specific communications protocol. In an aspect, transceiver 404 can be configured to support multiple operating networks and communications protocols. Thus, for example, transceiver 404 may enable transmission and/or reception of signals based on a specified modem configuration.

Referring to FIG. 5, an example of a method 500 is illustrated for activating and deactivating (e.g., by a device capable of wireless communications) communication resources according to a DRX cycle. In method 500, blocks indicated as dashed boxes represent optional steps.

Method 500 includes, at Block 502, activating communication resources for monitoring one or more channels related to a contention-based RAT based at least in part on a DRX cycle. In an aspect, resource managing component 440, e.g., in conjunction with processor(s) 402, memory 403, transceiver 404, etc., can activate the communication resources for monitoring one or more channels related to the contention-based RAT based at least in part on the DRX cycle. For example, as described, UE 115 can be configured with a DRX configuration (e.g., DRX configuration 480 received from access point 105) for receiving communications from the access point 105 in certain periods of time defined by a DRX cycle. The DRX configuration may include one or more of the parameters described above for defining at least one of a DRX cycle, an on-duration at the start of (or anytime during) the DRX cycle during which resource managing component 440 is to activate the communication resources, etc. In addition, the resource managing component 440 can start the DRX cycle based on at least one of detecting a period of inactivity over the resources (e.g., at one or more antennas 407, one or more transceivers 404, related RF front end components, etc.) during a duration of an inactivity timer, receiving a command to begin DRX from the access point 105, etc., and resource managing component 440 may accordingly activate the communication resource for monitoring the one or more channels based on detecting the period of inactivity, receiving the command, etc. Moreover, resource managing component 440 can activate the communication resources, which may include one or more antennas 407, one or more transceivers 404, one or more processors related to the transceiver 404 (e.g., a modem processor), an antenna, other components of a related RF front end, etc.

Method 500 also includes, at Block 504, monitoring the one or more channels related to the contention-based RAT in one or more time periods following activating the communication resources to determine whether communications are received from an access network node. In an aspect, channel monitoring component 442, e.g., in conjunction with processor(s) 402, memory 403, transceiver 404, etc., can monitor the one or more channels related to the contention-based RAT in the one or more time periods (e.g., via transceiver 404) following activating the communication resources by the resource managing component 440 to determine whether communications are received from an access network node (e.g., access point 105). For example, where one or more communications are received from the access network node over the one or more channels, this may indicate that the access network node has acquired the channel (e.g., that the access network node performed a successful CCA/eCCA) in the contention-based RAT, and can transmit communications to the UE 115. Thus, the UE 115 may modify one or more parameters of the DRX configuration based on detecting the communications from the access network node to at least partially align the DRX mode with acquisition of the contention-based resources by the access network node.

Accordingly, method 500 may also include, at Block 506, initializing an on-duration timer during which the communication resources remain active to receive the communications in the contention-based RAT based at least in part on determining that the communications are received from the access network node. In an aspect, timer managing component 444, e.g., in conjunction with processor(s) 402, memory 403, transceiver 404, etc., can initialize the on-duration timer 446 during which the communication resources remain active to receive the communications in the contention-based RAT based at least in part on determining that the communications are received from the access network node (e.g., access point 105). In an example, communicating component 361 can receive a value indicating a duration (e.g., as a number of subframes, milliseconds (ms), etc.) of the on-duration timer 446 in a DRX configuration 480, and can timer managing component 444 can initialize the on-duration timer 446 based on the value and based on determining that the communications are received from the access network node. Thus, as described, resource managing component 440 can maintain the active communication resources during the duration of the on-duration timer 446, and then can deactivate the communication resources for the remainder of a DRX cycle (or one or more other time periods during the DRX cycle), which can correspond to an off-duration.

In one example, the on-duration timer 446 may be similar to the onDurationTimer in LTE, but may also be a different timer, as described further herein. In any case, the on-duration timer is initialized based on receiving downlink communications from the access network node (e.g., access point 105), which can ensure that communication resources (at least resources for receiving all channels) are not activated by resource managing component 440 until downlink communications are detected from the access network node.

In any case, method 500 may also include, at Block 508, deactivating the communication resources following expiration of the on-duration timer. In an aspect, resource managing component 440, e.g., in conjunction with processor(s) 402, memory 403, transceiver 404, etc., can deactivate the communication resources following expiration of the on-duration timer 446, which can indicate the end of the on-duration and/or a start of an off-duration of the DRX cycle. In an example, timer managing component 444 can notify resource managing component 440 of the expiration of the on-duration timer 446 and/or of a value of the timer such that resource managing component 440 can determine when expiration of the on-duration timer 446 occurs. For example, resource managing component 440 can reactivate the communication resources in a next DRX cycle (e.g., short or long cycle) based on the parameters of the DRX configuration, as described above, such as detecting a period of inactivity, receiving a DRX command from an access point 105, etc.

In a specific example, monitoring the one or more channels at Block 504 may include monitoring for a downlink channel usage beacon signal (D-CUBS) from the access point 105. A D-CUBS may include a predetermined or unique waveform that allows the signal to be identified. A D-CUBS can typically indicate that the access point 105 has acquired the channel (e.g., successfully performed CCA/eCCA), and/or may include one or more parameters related to communicating with the access point 105 over the channel. Thus, detecting a D-CUBS transmitted by the access point 105 may be an indicator that the access point 105 has acquired the channel and is going to transmit additional downlink communications. Accordingly, monitoring the one or more channels at Block 504 may also optionally include, at Block 510, initializing a D-CUBS detection timer, and monitoring a broadcast channel to determine whether the D-CUBS is received from the access network node during a duration of the D-CUBS detection timer. In an aspect, timer managing component 444, e.g., in conjunction with processor(s) 402, memory 403, transceiver 404, etc., can initialize the D-CUBS detection timer 447, and channel monitoring component 442, e.g., in conjunction with processor(s) 402, memory 403, transceiver 404, etc., can monitor the broadcast channel to determine whether the D-CUBS is received from the access network node (e.g., from access point 105 in one or more downlink signals 406) during the duration of the D-CUBS detection timer 447. For example, channel monitoring component 442 can determine whether D-CUBS is received based at least in part on detecting receipt of a known waveform specifically associated with D-CUBS (e.g., all D-CUBS, D-CUBS transmitted by the access point 105, etc.). In this regard, timer managing component 444 can initialize the D-CUBS detection timer 447 before initializing the on-duration timer 446 (e.g., based on determining to start a DRX cycle, such as based on detecting a period of inactivity based on an inactivity timer, based on receiving a DRX command from the access point 10, etc., as described).

In this example, where a D-CUBS is detected from the access point 105 before expiration of the D-CUBS detection timer 447, timer managing component 444 can initialize the on-duration timer 446 for activating the communication resources to receive communications from the access point 105 during the on-duration, as described (e.g., at Block 506). For example, resource managing component 440 can have initially activated a portion of the communication resources for detecting D-CUBS (e.g., activate one or more antennas 407, one or more transceivers 404, related processors or RF front end components, etc. to receive signals over a channel related to D-CUBS, but not necessarily all channels). Accordingly, when D-CUBS is received over the monitored one or more channels at Block 504, method 500 can optionally include, at Block 512, activating the communication resources to receive one or more additional downlink channels related to the contention-based RAT for a duration of the on-duration timer based on receiving the D-CUBS. In an aspect, resource managing component 440, e.g., in conjunction with processor(s) 402, memory 403, transceiver 404, etc., can activate the communication resources (e.g., additional components, frequencies utilized by the components, time periods during which the components receive signals, etc.) to receive one or more additional downlink channels related to the contention-based RAT for the duration of the on-duration timer 446 based on receiving the D-CUBS. Thus, the on-duration for the DRX cycle can begin (and the communication resources are activated for receiving over the contention-based channel(s)) when the access point 105 has indicated it is to transmit communications based on the D-CUBS. In one example, the DRX configuration 480 may include a parameter indicating an offset time duration (e.g., a number of subframes, ms, etc.) between detecting D-CUSB and when to activate communication resources to receive communications from the access point 105 over the contention-based channel, which can allow for staggering multiple UE's activating resources for receiving communications from the access point.

In an example, where a D-CUBS is not received before expiration of the D-CUBS detection timer 447, timer managing component 444 can detect expiration of the timer, and resource managing component 440 can accordingly deactivate the communication resources (e.g., including the resources for receiving D-CUBS) until a next DRX cycle. Moreover, it is to be appreciated that a timer value for the D-CUBS detection timer 447 can be similarly received in the DRX configuration 480 from the access point 105 or otherwise determined to achieve a power consumption efficiency at the UE 115, a desired throughput, and/or the like. An example of performing D-CUBS monitoring in this regard is shown in FIG. 8.

FIG. 8 depicts an example of a communication timeline 800 including a plurality of subframes (e.g., numbered 0-9) for monitoring for D-CUBS and accordingly determining a DRX cycle. In an example, each subframe may correspond to a 1 ms transmission time interval of a 10 ms communication frame. For example, a UE can begin monitoring for D-CUBS from an access point at 802, which can be based on detecting inactivity for a period of an inactivity timer, receiving a DRX command from an access point, or other events that can cause starting of a DRX cycle, etc. In an example, the UE may also initialize a D-CUBS detection timer during which monitoring of D-CUBS takes place. In the depicted example, the UE can detect D-CUBS after subframe 9, and can activate additional communication resources to receive additional communications over a contention-based channel in subframe 0 at 804. Additionally, as described, the UE may also initialize the on-duration timer based on detecting D-CUBS. The access point accordingly transmits downlink communications in subframe 0 at 806 based on acquiring the channel and transmitting D-CUBS. Thus, the UE can receive the downlink communications from the access point for a duration of the on-duration timer (4 subframes in this example) starting from receiving the D-CUBS. Similarly, after the UE deactivates the communication resources, the UE can again monitor for D-CUBS at 812 (which can include activating a portion of the communication resources), and can detect the D-CUBS after subframe 4. Accordingly, the UE can activate additional portions of the communication resources at 814 for receiving downlink communications from the access point at 816 and/or initialize the on-duration timer. Moreover, in an example, after the UE deactivates the communication resources, the UE can monitor for D-CUBS at 820, but may not detect D-CUBS before expiration of the D-CUBS detection timer (e.g., after 15 subframes). In this example, the communication resources may not be activated, and the on-duration timer need not be initialized, as no D-CUBS is detected. Accordingly, the UE can maintain deactivated communication resources and can begin to monitor for D-CUBS in a next DRX cycle, and so on.

Referring to FIG. 6, an example of a method 600 is illustrated for activating and deactivating (e.g., by a device capable of wireless communications) communication resources according to a DRX cycle. In method 600, blocks indicated as dashed boxes represent optional steps.

Similarly to method 500, method 600 includes, at Block 502, activating communication resources for monitoring one or more channels related to a contention-based RAT based at least in part on a DRX cycle. In addition, method 600 includes, at Block 504, monitoring the one or more channels related to the contention-based RAT in one or more time periods following activating the communication resources to determine whether communications are received from an access network node. Also, method 600 includes, at Block 506, initializing an on-duration timer during which the communication resources remain active to receive the communications in the contention-based RAT based at least in part on determining that the communications are received from the access network node. Method 600 may also include, at Block 508, deactivating the communication resources following expiration of the on-duration timer.

In addition, in a specific example, monitoring the one or more channels at Block 504 may include performing blind detection of downlink subframes (e.g., based on receiving a reference signal, PDCCH, etc.). Once a downlink subframe is detected, communications can be received for the on-duration and then communication resources can be deactivated. In this example, activating the communication resources at Block 502 may optionally include, at Block 602, initializing a second on-duration timer based at least in part on the DRX cycle, and activating the communication resources based on a duration of the second on-duration timer. In an example, timer managing component 444, e.g., in conjunction with processor(s) 402, memory 403, transceiver 404, etc., can initialize the second on-duration timer, which can be the on-duration timer 446, and resource managing component 440 can activate the communication resources based on a duration of the second on-duration timer (e.g., of on-duration timer 446). Thus, channel monitoring component 442, in this example, can monitor the one or more channels for reference signals, PDCCH, etc. related to identifying downlink subframes for the duration of the second on-duration timer (e.g., on-duration timer 446).

In addition, initializing the on-duration timer based on determining that communications are received from the access network node (e.g., access point 105) at Block 506 may correspond to timer managing component 444 initializing a minimum on-duration timer 448, which may have a value less than the on-duration timer 446, to allow for receiving the communications in DRX mode. Accordingly, for example, communicating component 361 can receive communications from the access point 105 over the contention-based channel for a period of time defined by the minimum on-duration timer 448, and then resource managing component 440 can deactivate the communication resources until a next DRX cycle. Furthermore, in this regard, initializing the on-duration timer at Block 506 may optionally include, at Block 604, stopping the second on-duration timer based at least in part on determining that the communications are received from the access network node. In an aspect, timer managing component 444, e.g., in conjunction with processor(s) 402, memory 403, transceiver 404, etc., can stop the second on-duration timer (e.g., on-duration timer 446) based at least in part on determining that the communications are received from the access network node (e.g., from access point 105). Thus, when both the on-duration timer 446 and the minimum on-duration timer 448 expire, resource managing component 440 can deactivate the communication resources. An example of monitoring for downlink subframes and accordingly determining a DRX cycle are shown in FIG. 9.

FIG. 9 illustrates an example of a communication timeline 900 including a plurality of subframes (e.g., numbered 0-9) for monitoring for downlink subframes and accordingly determining a DRX cycle. For example, a UE can begin monitoring for downlink subframes from an access point at 902, which can be based on detecting inactivity for a period of an inactivity timer, receiving a DRX command from an access point, etc., or otherwise starting an on-duration timer. This may include initializing the on-duration timer. In the depicted example, the UE can detect a downlink subframe in subframe 0, and can begin receiving communications over the contention-based channel in subframe 0 at 904. The UE can additionally initialize a minimum on-duration timer for receiving the downlink communications from the access point (which can be 4 subframes in this example). The UE may also stop the on-duration timer based on detecting the downlink subframe. Thus, once the on-duration and minimum on-duration timers are expired, the UE deactivates the communication resources (after subframe 3), and the UE can again monitor for downlink signals at 912 and can detect downlink signals at 914 in subframe 5. Accordingly, the UE can again initialize the minimum on-duration timer and end the on-duration timer. Moreover, in an example, after the UE deactivates the communication resources, the UE can monitor for downlink signals at 920, but may not detect downlink signals before expiration of the on-duration timer (e.g., after 15 subframes). In this example, the communication resources may be deactivated based on expiration of the on-duration timer and minimum on-duration timer. Accordingly, the UE can maintain deactivated communication resources and can begin to monitor for downlink subframes in a next DRX cycle.

Referring to FIG. 7, an example of a method 700 is illustrated for activating and deactivating (e.g., by a device capable of wireless communications) communication resources according to a DRX cycle. In method 700, blocks indicated as dashed boxes represent optional steps.

Similarly to methods 500 and 600, method 700 includes, at Block 502, activating communication resources for monitoring one or more channels related to a contention-based RAT based at least in part on a DRX cycle. In addition, method 700 includes, at Block 504, monitoring the one or more channels related to the contention-based RAT in one or more time periods following activating the communication resources to determine whether communications are received from an access network node. Also, method 700 includes, at Block 506, initializing an on-duration timer during which the communication resources remain active to receive the communications in the contention-based RAT based at least in part on determining that the communications are received from the access network node. Method 700 may also include, at Block 508, deactivating the communication resources following expiration of the on-duration timer.

Method 700 also optionally includes, at Block 702, receiving an indication of a number of downlink subframes remaining in the communications received from the access network node. In an aspect, communicating component 361, e.g., in conjunction with processor(s) 402, memory 403, transceiver 404, etc., can receive the indication of the number of downlink subframes remaining in the communications received from the access network node (e.g., access point 105). For example, access point 105 can transmit, and communicating component 361 can receive (e.g., via transceiver 404), the number of downlink subframes remaining in the communications from access point 105 before the access point 105 relinquishes the channel. In one example, access point 105 can signal the number of remaining subframes to UE 115 in dedicated signaling, in broadcast signaling, etc., which may occur once per UE 115, in each subframe, and/or the like.

Method 700 may also optionally include, at Block 704, determining a subframe for requesting another channel in the contention-based RAT for transmitting uplink communications based at least in part on the number of downlink subframes. In an aspect, communicating component 361, e.g., in conjunction with processor(s) 402, memory 403, transceiver 404, etc., can determine the subframe for requesting another channel in the contention-based RAT for transmitting uplink communications based at least in part on the number of downlink subframes. Thus, for example, communicating component 361 can perform a CCA/eCCA over the contention-based channel in an attempt to acquire the channel for uplink communications following the number of downlink subframes. For example, in FIGS. 8 and 9, the UE can receive an indication of the number of downlink subframes from the access point for the downlink communications at 806/906, and can determine the downlink subframes end at subframe 5. Accordingly, in subframe 6, at 830/930, UE can perform a CCA/eCCA to acquire the channel for uplink communications. Similarly, the UE can receive an indication of the number of downlink subframes from the access point for the downlink communications at 816/916, and can determine the downlink subframes end at subframe 0. Accordingly, in subframe 1, at 832/932, UE can perform a CCA/eCCA to acquire the channel for uplink communications, and the UE can accordingly transmit uplink communications to the access point.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for receiving communications in contention-based radio access technologies (RAT), comprising:
   starting a discontinuous receive (DRX) cycle based on detecting a period of inactivity over communication resources, wherein the period of inactivity is based on a duration of an inactivity timer;
   activating the communication resources for monitoring one or more channels related to a contention-based RAT based at least in part on the DRX cycle;
   initializing, based on activating the communication resources, a downlink channel usage beacon signal (D-CUBS) detection timer;
   monitoring, for a duration of the D-CUBS detection timer, a broadcast channel of the one or more channels related to the contention-based RAT in one or more time periods following activating the communication resources to determine whether first communications, including a D-CUBS, are received from an access network node over the broadcast channel;
   where it is determined that the first communications are received from the access network node over the broadcast channel during the duration of the D-CUBS detection timer:
      initializing an on-duration timer during which the communication resources remain active for an on-duration of the DRX cycle to receive second communications in the contention-based RAT; and
      deactivating the communication resources following expiration of the on-duration timer.

2. The method of claim 1, further comprising activating the communication resources to receive the second communications, including one or more additional downlink channels related to the contention-based RAT, for a duration of the on-duration timer based at least in part on determining that the D-CUBS is received from the access network node.

3. The method of claim 2, wherein activating the communication resources to receive the one or more additional downlink channels occurs an offset duration after determining that the D-CUBS is received from the access network node.

4. The method of claim 1, further comprising receiving a value indicating the duration of the D-CUBS detection timer in a configuration from the access network node.

5. The method of claim 1, further comprising initializing a second on-duration timer based at least in part on the DRX cycle, wherein activating the communication resources for monitoring the one or more channels related to the contention-based RAT is based at least in part on a duration of the second on-duration timer, and wherein the on-duration timer is a minimum on-duration timer having a duration less than the second on-duration timer.

6. The method of claim 5, further comprising stopping the second on-duration timer based at least in part on determining that the second communications are received from the access network node.

7. The method of claim 5, wherein the second communications received from the access network node correspond to at least one of a downlink reference signal or a downlink control channel.

8. The method of claim 5, further comprising receiving a duration of the minimum on-duration timer in a configuration from the access network node.

9. The method of claim 1, further comprising:
receiving an indication of a number of downlink subframes remaining in the second communications received from the access network node; and
determining, based at least in part on the number of downlink subframes, a subframe for requesting another channel in the contention-based RAT for transmitting uplink communications.

10. An apparatus for receiving communications in contention-based radio access technologies (RAT), comprising:
a transceiver;
one or more antenna coupled to the transceiver for communicating signals in a wireless network;
at least one processor communicatively coupled with the transceiver via a bus; and
a memory communicatively coupled with the at least one processor and/or the transceiver via the bus;
wherein the at least one processor is configured to:
start a discontinuous receive (DRX) cycle based on detecting a period of inactivity over communication resources, wherein the period of inactivity is based on a duration of an inactivity timer;
activate the communication resources for monitoring one or more channels related to a contention-based RAT based at least in part on the DRX cycle;
initialize, based on activating the communication resources, a downlink channel usage beacon signal (D-CUBS) detection timer;
monitor, via the transceiver and for a duration of the D-CUBS detection timer, a broadcast channel of the one or more channels related to the contention-based RAT in one or more time periods following activating the communication resources to determine whether first communications, including a D-CUBS, are received from an access network node over the broadcast channel;
where it is determined that the first communications are received from the access network node over the broadcast channel during the duration of the D-CUBS detection timer:
initialize an on-duration timer during which the communication resources remain active for an on-duration of the DRX cycle to receive second communications in the contention-based RAT; and
deactivate the communication resources following expiration of the on-duration timer.

11. The apparatus of claim 10, wherein the at least one processor is further configured to activate the communication resources to receive the second communications, including one or more additional downlink channels related to the contention-based RAT, for a duration of the on-duration timer based at least in part on determining that the D-CUBS is received from the access network node.

12. The apparatus of claim 11, wherein the at least one processor is configured to activate the communication resources to receive the one or more additional downlink channels at an offset duration after determining that the D-CUBS is received from the access network node.

13. The apparatus of claim 10, wherein the at least one processor is further configured to receive a value indicating the duration of the D-CUBS detection timer in a configuration from the access network node.

14. The apparatus of claim 10, wherein the at least one processor is further configured to initialize a second on-duration timer based at least in part on the DRX cycle, wherein the at least one processor is configured to activate the communication resources for monitoring the one or more channels related to the contention-based RAT based at least in part on a duration of the second on-duration timer, and wherein the on-duration timer is a minimum on-duration timer having a duration less than the second on-duration timer.

15. The apparatus of claim 14, wherein the at least one processor is further configured to stop the second on-duration timer based at least in part on determining that the second communications are received from the access network node.

16. The apparatus of claim 14, wherein the second communications received from the access network node correspond to at least one of a downlink reference signal or a downlink control channel.

17. The apparatus of claim 14, wherein the at least one processor is further configured to receive a duration of the minimum on-duration timer in a configuration from the access network node.

18. The apparatus of claim 10, wherein the at least one processor is further configured to:
receive an indication of a number of downlink subframes remaining in the second communications received from the access network node; and
determine, based at least in part on the number of downlink subframes, a subframe for requesting another channel in the contention-based RAT for transmitting uplink communications.

19. An apparatus for receiving communications in contention-based radio access technologies (RAT), comprising:
means for starting a discontinuous receive (DRX) cycle based on detecting a period of inactivity over communication resources, wherein the period of inactivity is based on a duration of an inactivity timer;

means for activating the communication resources for monitoring one or more channels related to a contention-based RAT based at least in part on the DRX cycle;

means for initializing, based on activating the communication resources, a downlink channel usage beacon signal (D-CUBS) detection timer;

means for monitoring, for a duration of the D-CUBS detection timer, a broadcast channel of the one or more channels related to the contention-based RAT in one or more time periods following activating the communication resources to determine whether first communications, including the D-CUBS, are received from an access network node over the broadcast channel;

where it is determined that the first communications are received from the access network node over the broadcast channel during the duration of the D-CUBS detection timer, means for initializing an on-duration timer during which the communication resources remain active for an on-duration of the DRX cycle to receive second communications in the contention-based RAT; and means for deactivating the communication resources following expiration of the on-duration timer.

20. The apparatus of claim 19, further comprising means for activating the communication resources to receive the second communications, including one or more additional downlink channels related to the contention-based RAT, for a duration of the on-duration timer based at least in part on determining that the D-CUBS is received from the access network node.

21. The apparatus of claim 20, further comprising means for activating the communication resources to receive the one or more additional downlink channels at an offset duration after determining that the D-CUBS is received from the access network node.

22. The apparatus of claim 19, further comprising means for initializing a second on-duration timer based at least in part on the DRX cycle, wherein the means for activating activates the communication resources for monitoring the one or more channels related to the contention-based RAT based at least in part on a duration of the second on-duration timer, and wherein the on-duration timer is a minimum on-duration timer having a duration less than the second on-duration timer.

23. A non-transitory computer-readable storage medium comprising computer-executable code for receiving communications in contention-based radio access technologies (RAT), the code comprising:

code for starting a discontinuous receive (DRX) cycle based on detecting a period of inactivity over communication resources, wherein the period of inactivity is based on a duration of an inactivity timer;

code for activating the communication resources for monitoring one or more channels related to a contention-based RAT based at least in part on the DRX cycle;

code for initializing, based on activating the communication resources, a downlink channel usage beacon signal (D-CUBS) detection timer;

code for monitoring, for a duration of the D-CUBS detection timer, a broadcast channel of the one or more channels related to the contention-based RAT in one or more time periods following activating the communication resources to determine whether first communications, including the D-CUBS, are received from an access network node over the broadcast channel;

where it is determined that the first communications are received from the access network node over the broadcast channel during the duration of the D-CUBS detection timer:

code for initializing an on-duration timer during which the communication resources remain active for an on-duration of the DRX cycle to receive second communications in the contention-based RAT; and code for deactivating the communication resources following expiration of the on-duration timer.

24. The non-transitory computer-readable storage medium of claim 23, further comprising code for activating the communication resources to receive the second communications, including one or more additional downlink channels related to the contention-based RAT, for a duration of the on-duration timer based at least in part on determining that the D-CUBS is received from the access network node.

25. The non-transitory computer-readable storage medium of claim 24, further comprising code for activating the communication resources to receive the one or more additional downlink channels at an offset duration after determining that the D-CUBS is received from the access network node.

26. The non-transitory computer-readable storage medium of claim 23, further comprising code for initializing a second on-duration timer based at least in part on the DRX cycle, wherein the code for activating activates the communication resources for monitoring the one or more channels related to the contention-based RAT based at least in part on a duration of the second on-duration timer, and wherein the on-duration timer is a minimum on-duration timer having a duration less than the second on-duration timer.

* * * * *